Patented Nov. 21, 1922.

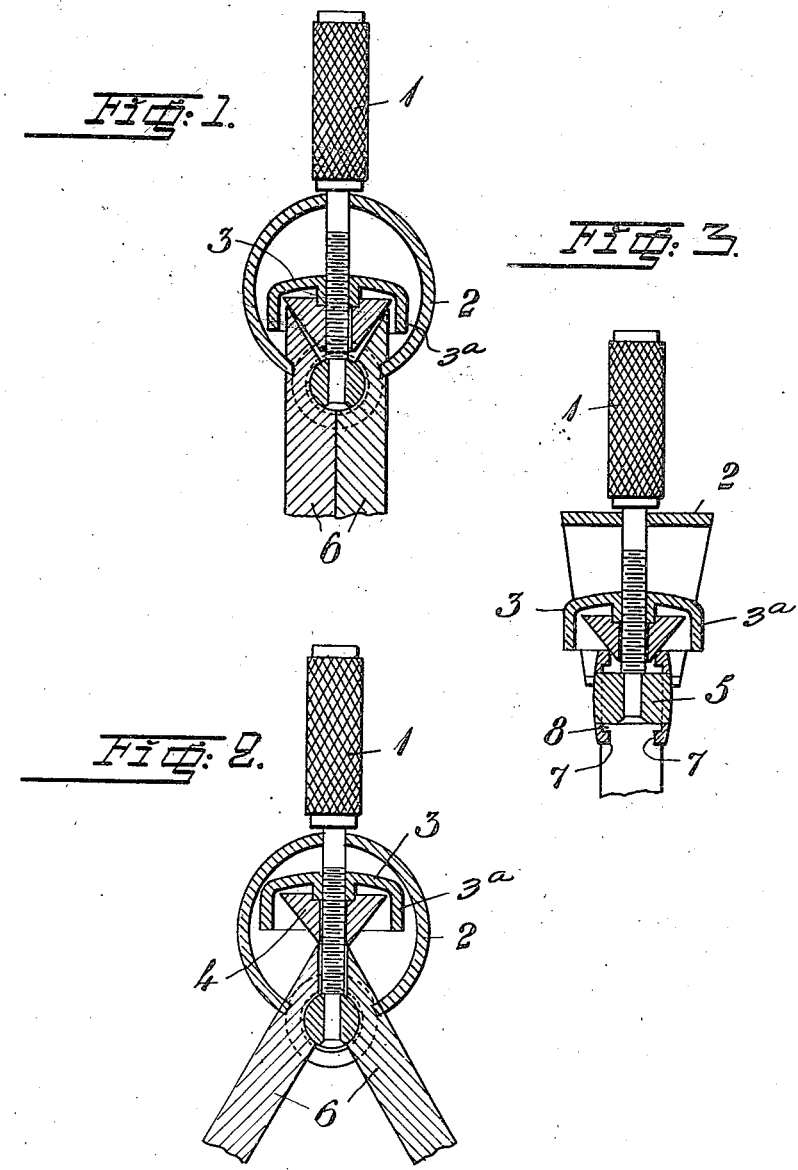

1,436,143

UNITED STATES PATENT OFFICE.

AXEL EDVIN TEODOR BERGSTRÖM, OF STOCKHOLM, SWEDEN, ASSIGNOR TO AKTIEBOLAGET PATRIA, OF STOCKHOLM, SWEDEN, A CORPORATION.

CALIPERS, SPRING CALIPERS, AND THE LIKE.

Application filed May 21, 1920. Serial No. 383,246.

*To all whom it may concern:*

Be it known that I, AXEL EDVIN TEODOR BERGSTRÖM, subject of the King of Sweden, residing at Stockholm, Sweden, have invented certain new and useful Improvements in Calipers, Spring Calipers, and the like, (for which I have filed an application in Sweden, May 14, 1919,) of which the following is a specification.

This invention relates to calipers and similar instruments of the type wherein the legs tend to separate under the action of spring means and the pivotally connected portions of the legs are arranged upon opposite sides of the pivot and are retained in assembled position by means of collars or flanges carried by the pivot and provided with projecting annular ribs engaging complementary grooves or recesses in the legs.

According to the present invention the legs of the calipers are beveled at their pivoted ends, for the reception of a cone or frustum which is adapted to be inserted therebetween to close or contract the legs against the action of the spring means, the cone or frustum being preferably loosely mounted on a screw secured to the pivot of the calipers and adjustable by means of a nut mounted upon the screw.

An embodiment of the invention is shown in the accompanying drawing in which Figs. 1 and 2 disclose a pair of spring calipers according to the invention, the same being illustrated in vertical section, Fig. 1 showing the calipers in their closed position, whereas Fig. 2 shows them in their spread out position. Fig. 3 is a vertical section of the calipers in a plane perpendicular to that of Figs. 1 and 2.

Referring to the drawing, the instrument comprises legs 6 mounted for swinging movement about a pivot 5 and having beveled pivoted ends 9. A spring 2 engages notches formed in the legs somewhat above the axis of the pivot 5. Mounted in the spring 2 and pivot 5 is a screw 10 having a handle portion 1 and a substantially conical member 4 is loosely mounted for sliding movement upon the screw and is advanced toward the pivot 5 by means of a nut 3 which is fitted upon the screw threads of the screw. By adjusting the nut 3, the conical member 4 may be moved between the faces 9 to the extent necessary to obtain any desired adjustment of the instrument.

The pivot 5 is provided or connected with two collars or flanges 7 situated on either side at the ends of the pivot. Preferably, these flanges are made separately and riveted to the pivot, as shown in the drawing, the flanges being directed inwardly toward each other. The legs in turn are provided with a cut or a slot for the flanges 7 so as to form a collar or an annular boss on the legs between the flanges and the pivot, the said collar or boss retaining and guiding the legs in the flange 7, this being so also in the case of the common spring breaking by some reason or other. If desired, only one collar or flange 7 may be employed.

Obviously, in this construction, the legs can never be unintentionally dislocated from the position they have once been set in, this being prevented by the notch-like members 7 engaging the legs.

Evidently, the spring 2 may, without inconvenience, be replaced by a spring arranged between the legs under the pivot.

The nut 3 is provided with a laterally projecting flange 3$^a$ which overhangs the wedge element 4 and prevents accidental contact of the latter with the hands or objects during the use of the instrument and thereby minimizes liability of displacement of the wedge element.

What I claim as new and desire to secure by Letters Patent of the United States is:—

In an instrument of the type described, a pair of legs, means pivotally connecting the legs, spring means normally tending to separate the legs, a screw carried by the pivot means, an adjustable conical wedge slidably mounted on said screw, and a nut threaded on said screw and provided with a laterally projecting cup shaped flange extending over and around the conical wedge member.

In testimony whereof I affix my signature in presence of two witnesss.

AXEL EDVIN TEODOR BERGSTRÖM.

Witnesses:
 HELG ANDERSSON,
 S. TROVENSON.